(12) United States Patent
Kuma

(10) Patent No.: US 8,437,548 B2
(45) Date of Patent: May 7, 2013

(54) MOVING IMAGE EXTRACTING APPARATUS, PROGRAM AND MOVING IMAGE EXTRACTING METHOD

(75) Inventor: Satoru Kuma, Tokyo (JP)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 12/796,749

(22) Filed: Jun. 9, 2010

(65) Prior Publication Data

US 2011/0013838 A1 Jan. 20, 2011

(30) Foreign Application Priority Data

Jul. 16, 2009 (JP) .................................. 2009-167909

(51) Int. Cl.
  *G06K 9/34* (2006.01)
(52) U.S. Cl.
  USPC ........................................................ 382/173
(58) Field of Classification Search .................. None
  See application file for complete search history.

(56) References Cited

U.S. PATENT DOCUMENTS

| | | | | |
|---|---|---|---|---|
| 6,493,042 B1* | 12/2002 | Bozdagi et al. | ............... | 348/700 |
| 7,266,150 B2* | 9/2007 | Demos | ..................... | 375/240.15 |
| 7,483,618 B1* | 1/2009 | Edwards et al. | ............... | 386/278 |
| 7,616,248 B2* | 11/2009 | Parulski et al. | ........... | 348/333.11 |
| 7,929,801 B2* | 4/2011 | Nakamura et al. | ............. | 382/285 |
| 8,111,754 B1* | 2/2012 | Demos | ..................... | 375/240.16 |
| 2009/0016567 A1* | 1/2009 | Aiso et al. | ..................... | 382/100 |
| 2011/0102674 A1* | 5/2011 | Mertens | ........................ | 348/515 |
| 2011/0255844 A1* | 10/2011 | Wu et al. | ........................ | 386/278 |

FOREIGN PATENT DOCUMENTS

JP 2004-180290 6/2004

* cited by examiner

*Primary Examiner* — Chan S Park
*Assistant Examiner* — Sean Motsinger
(74) *Attorney, Agent, or Firm* — Oblon, Spivak, McClelland, Maier & Neustadt, L.L.P.

(57) ABSTRACT

There is provided a moving image extracting apparatus including a blur value obtaining unit to obtain a blur value which indicates a blur degree of each frame constituting a moving image, a segment determining unit to discriminate the moving image between a stable segment of which variance of the blur values obtained by the blur value obtaining unit is lower than a first value and an unstable segment which is not the stable segment, and an extracting unit to perform segment extraction from the moving image based on the stable segment or the unstable segment obtained by the segment determining unit.

13 Claims, 17 Drawing Sheets

MOVING IMAGE EXTRACTING APPARATUS, PROGRAM AND MOVING IMAGE EXTRACTING METHOD

BACKGROUND OF THE INVENTION

1. Field of the Invention

The present invention relates to a moving image extracting apparatus, a program and a moving image extracting method.

2. Description of the Related Art

Recently, an imaging device capable of taking a moving image by converting incident light into electrical signals has been widely spread. With this imaging device, a user can keep scenes of an athletic festival of children, travel scenes and scenes of a pet as a moving image.

Further, software for automatic editing to prepare a short movie by extracting a segment from a moving image obtained by the imaging device has been proposed. With this software for automatic editing, an extraction segment of the moving image is determined at random, for example. An example of such software for automatic editing of a moving image has been disclosed in Japanese Patent Application Laid-Open No. 2004-159331.

SUMMARY OF THE INVENTION

However, with the above software for automatic editing, since the extraction segment of the moving image is determined at random, for example, it has been difficult to extract a desired segment for a user. For example, there may be a case that the above software for automatic editing extracts a defocused and blurred part of the moving image even when the user desires to extract an attractive part of the moving image.

In light of the foregoing, it is desirable to provide a novel and improved moving image extracting apparatus, a program and a moving image extracting method capable of performing segment extraction from a moving image in accordance with a blur value of each frame.

According to an embodiment of the present invention, there is provided a moving image extracting apparatus including a blur value obtaining unit to obtain a blur value which indicates a blur degree of each frame constituting a moving image, a segment determining unit to discriminate the moving image between a stable segment of which variance of the blur values obtained by the blur value obtaining unit is lower than a first value and an unstable segment which is not the stable segment and an extracting unit to perform segment extraction from the moving image based on the stable segment or the unstable segment obtained by the segment determining unit.

The segment determining unit may include a primary processing unit which sequentially selects a different frame in the moving image as a start point and defines a stable segment while expanding a segment including the selected frame until variance of the blur values exceeds the first value.

The primary processing unit may repeat defining the stable segment until any frame which is not defined as a stable segment and which is not selected as a start point does not exist.

The segment determining unit may include a secondary processing unit which determines whether or not variance of blur values of a segment including each unstable segment and defined stable segments at before and after the unstable segment is smaller than the first value and defines the segment as a stable segment when the variance of the blur values of the segment is smaller than the first value.

The segment determining unit may include a tertiary processing unit which expands the stable segment defined by the secondary processing unit until the variance of the blur values exceeds the first value.

The extracting unit may extract a segment of which average value of the blur values is smaller than a second value among the stable segments and the unstable segments.

The extracting unit may extract a segment of which segment length is longer than a third value in addition to being smaller of the average value of the blur values than the second value.

The extracting unit may extract a segment of which maximum blur value is larger than a fourth value and a segment of which segment length is shorter than a fifth value among the stable segments and the unstable segments.

The extracting unit may further extract an unstable segment adjacent to a stable segment of which maximum blur value is larger than the fourth value.

The moving image extracting apparatus may further include a buffer to temporarily store a blur value of a new frame obtained by the blur value obtaining unit. The segment determining unit may perform discriminating of the moving image after blur values of unprocessed frames of a predetermined amount or more are stored at the buffer.

The segment determining unit may expand a stable segment including a frame immediately previous to an unprocessed frame to the unprocessed frame side until the variance of the blur values exceeds the first value in a case that the immediately previous frame is included in the stable segment.

According to another embodiment of the present invention, there is provided a program for causing a computer to function as a blur value obtaining unit to obtain a blur value which indicates a blur degree of each frame constituting a moving image, a segment determining unit to discriminate the moving image between a stable segment of which variance of the blur values obtained by the blur value obtaining unit is lower than a first value and an unstable segment which is not the stable segment, and an extracting unit to perform segment extraction from the moving image based on the stable segment or the unstable segment obtained by the segment determining unit.

According to another embodiment of the present invention, there is provided a moving image extracting method, comprising the steps of obtaining a blur value which indicates a blur degree of each frame constituting a moving image discriminating the moving image between a stable segment of which variance of the blur values is smaller than a first value and an unstable segment which is not the stable segment, and performing segment extraction from the moving image based on the stable segment or the unstable segment.

According to the moving image extracting apparatus, the program and the moving image extracting method of the present invention described above, segment extraction from a moving image can be performed in accordance with a blur value of each frame.

DETAILED DESCRIPTION OF THE EMBODIMENT(S)

Figure 1:
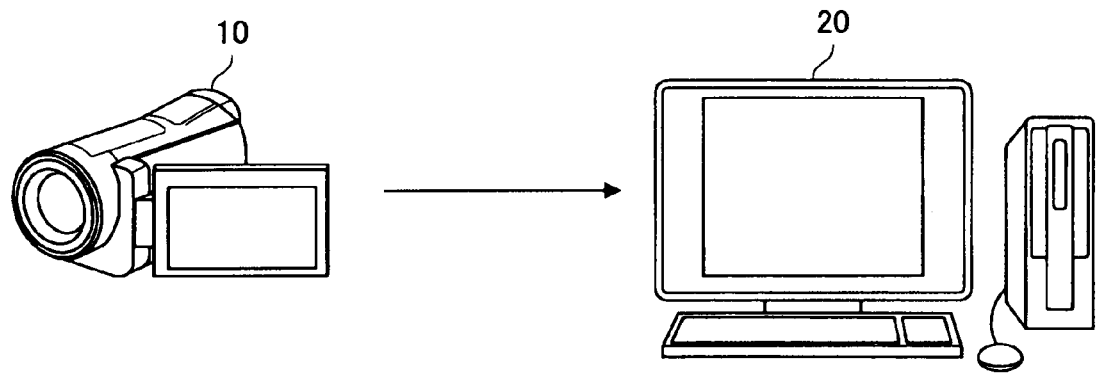
FIG. 1 is an explanatory view which illustrates an image extracting system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Embodiments of the present invention will be described in the following order.
1. Outline of image extracting apparatus
2. First embodiment
    2-1. Hardware configuration of image extracting apparatus
    2-2. Functions of image extracting apparatus
    2-3. Operation of image extracting apparatus
3. Second embodiment
4. Summary

1. Outline of Image Extracting Apparatus

First, a moving image extracting apparatus 20 according to an embodiment of the present invention will be schematically described with reference to FIGS. 1 and 2.

FIG. 1 is an explanatory view of an image extracting system 1 according to an embodiment of the present invention.

As illustrated in FIG. 1, the image extracting system 1 includes an imaging device 10 and the moving image extracting apparatus 20.

The imaging device 10 obtains a moving image including a plurality of frames by converting incident light into electrical signals. Further, the imaging device 10 stores the obtained moving image to a storage medium mounted integrally on the imaging device 10 or a storage medium attached to the imaging device 10 in a detachably attachable manner. Here, the imaging device 10 may start obtaining a moving image based on recording start operation of a user and may end obtaining the moving image based on recording end operation of the user.

The moving image extracting apparatus 20 obtains the moving image taken by imaging with the imaging device 10. For example, the moving image extracting apparatus 20 may have a storage medium having the moving image recorded and may obtain the moving image from the storage medium. Instead, the imaging device 10 may transmit a moving image by wired or wireless and the moving image extracting apparatus 20 may receive the moving image transmitted from the imaging device 10.

In FIG. 1, a personal computer (PC) is illustrated as an example of the moving image extracting apparatus 20. However, the moving image extracting apparatus 20 is not limited to a PC. For example, the moving image extracting apparatus 20 may be an information processing apparatus such as a home video processing apparatus (a DVD recorder, a videocassette recorder and the like), a personal digital assistant (PDA), home game equipment and a home electrical appliance. Further, the moving image extracting apparatus 20 may be an information processing apparatus such as a cellular phone, a personal handyphone system (PHS), a portable music player, a portable video processing device and portable game equipment.

The moving image extracting apparatus 20 extracts a segment from the obtained moving image. For example, the moving image extracting apparatus 20 extracts a failed cut or a suggested cut from the moving image based on a blur degree of each frame which constitutes the moving image. In the following, the flow until the moving image extracting apparatus 20 extracts a failed cut or a suggested cut is briefly described with reference to FIG. 2.

Figure 2:
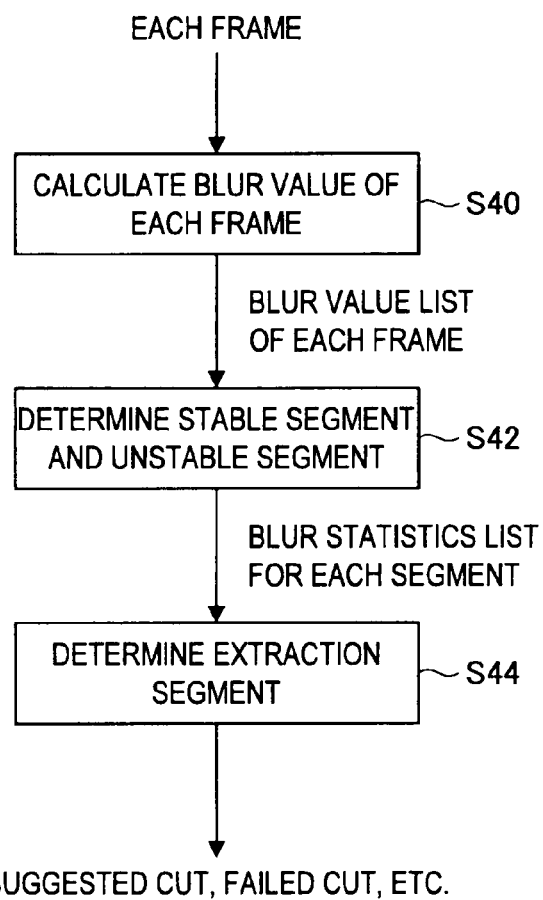
FIG. 2 is an explanatory view which illustrates a schematic flow of operation of the moving image extracting apparatus.

FIG. 2 is an explanatory view illustrating a schematic flow of the operation of the moving image extracting apparatus 20. As illustrated in FIG. 2, the moving image extracting apparatus 20 calculates a blur value of each frame constituting a moving image (S40). Here, the blur value being an index to indicate a blur degree indicates that the blur degree is to be high as the value increases.

Next, the moving image extracting apparatus 20 determines a stable segment and an unstable segment in the moving image (S42). Here, the stable segment is a segment having a blur value variance equal to or smaller than a threshold value Th1. The unstable segment is a segment having a blur value variance larger than the threshold value Th1, that is, a segment having larger blur degree variation than that of the stable segment.

Next, the moving image extracting apparatus 20 determines an extraction segment based on a list indicating blur statistics of each segment (S44). For example, the moving image extracting apparatus 20 may extract a suggested cut or a failed cut based on the list indicating blur statistics such as an average blur value, a maximum blur value and a blur value variance of each segment.

As described above, the moving image extracting apparatus 20 according to the embodiment of the present invention is capable of extracting a suggested cut or a failed cut based on a blur value of each frame constituting a moving image. In the following, the moving image extracting apparatus 20 will be described in detail with reference to FIGS. 13 to 19.

2. First Embodiment

2-1. Hardware Configuration of Image Extracting Apparatus

Figure 3:
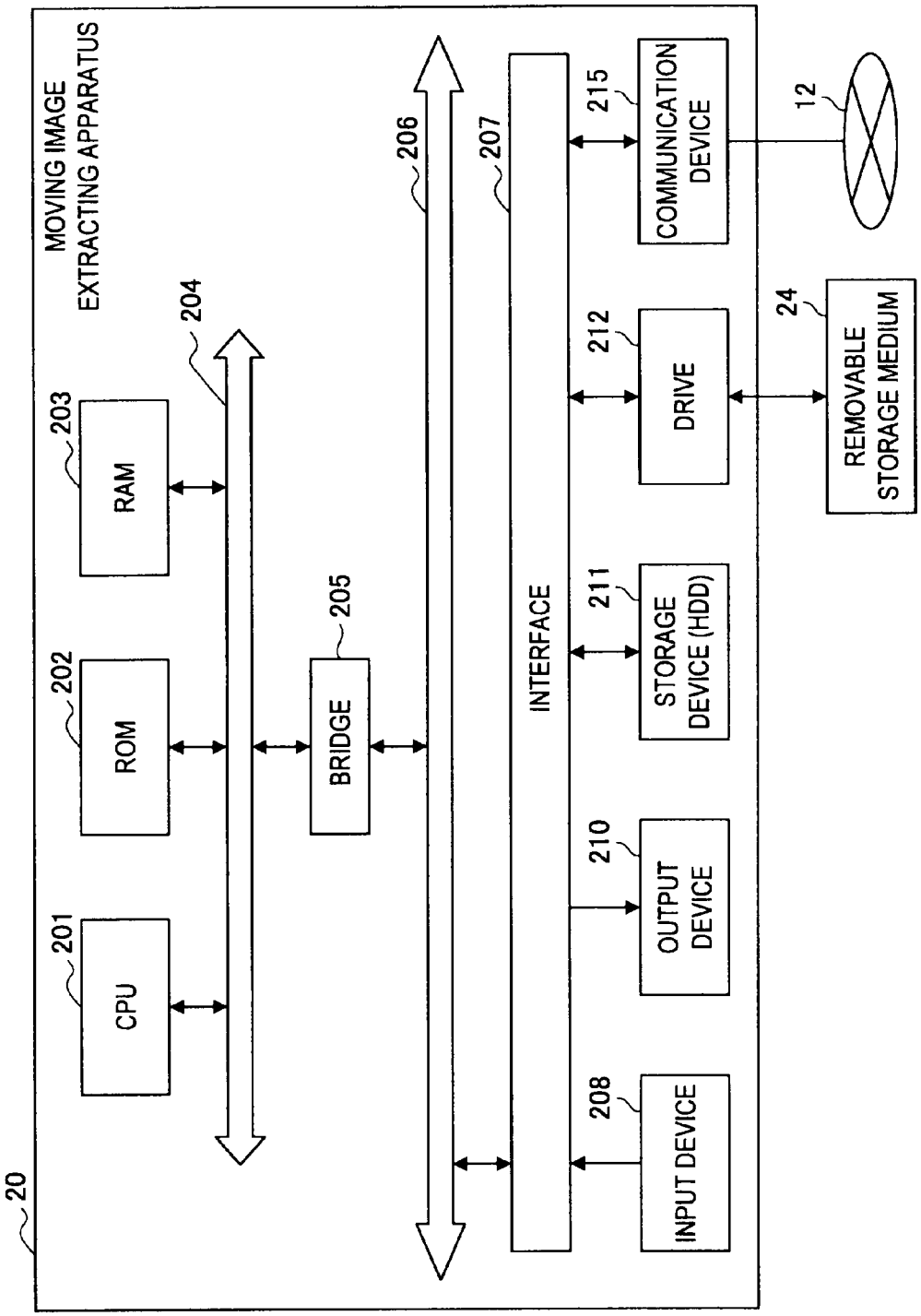
FIG. 3 is a block diagram which illustrates a hardware configuration of the moving image extracting apparatus.

FIG. 3 is a block diagram illustrating the hardware configuration of the moving image extracting apparatus 20. The moving image extracting apparatus 20 includes a central processing unit (CPU) 201, a read only memory (ROM) 202, a random access memory (RAM) 203 and a host bus 204. In addition, the moving image extracting apparatus 20 includes a bridge 205, an external bus 206, an interface 207, an input device 208, an output device 210, a storage device (HDD) 211, a drive 212 and a communication device 215.

The CPU 201 functions as an arithmetic processing unit and a controlling unit and controls general operation in the moving image extracting apparatus 20 in accordance with a variety of programs. The CPU 201 may be a microprocessor. The ROM 202 stores the programs and arithmetic parameters to be used by the CPU 201. The RAM 203 temporarily stores programs to be used during the operation of the CPU 201, parameters to vary appropriately during the operation thereof and the like. These are mutually connected by the host bus 204 constituted with a CPU bus and the like.

The host bus 204 is connected to the external bus 206 such as a peripheral component interconnect/interface (PCI) bus via the bridge 205. Here, it is not necessary to separately constitute the host bus 204, the bridge 205 and the external bus 206. The functions thereof may be mounted on a single bus.

The input device 208 is constituted with an input means such as a mouse, a keyboard, a touch panel, a button, a microphone, a switch and a lever to input information by a user, and an input controlling circuit to generate an input signal based on the input by the user and to output the signal to the CPU 201. The user of the moving image extracting apparatus 20 can input a variety of data and instruct process operation by operating the input device 208.

The output device 210 includes a display device such as a cathode ray tube (CRT) display device, a liquid crystal display (LCD) device, an organic light emitting diode (OLED) device and a lamp. Further, the output device 210 includes an audio output device such as a speaker and a headphone. The output device 210 outputs a reproduced content, for example. Specifically, the display device displays various types of information such as reproduced video data with texts or images. Meanwhile, the audio output device converts reproduced audio data and the like into audio and outputs the audio.

The storage device 211 is a device for data storage configured to be an example of a memory unit of the moving image extracting apparatus 20 according to the present embodiment. The storage device 211 may include a storage medium, a recording device to record data at the storage medium, a reading device to read the data from the storage medium, and a deleting device to delete the data recorded at the storage medium. The storage device 211 is configured with a hard disk drive (HDD), for example. The storage device 211 drives the hard disk and stores programs to be executed by the CPU 201 and a variety of data.

The drive 212 is a reader/writer for the storage medium and is incorporated by or externally attached to the moving image extracting apparatus 20. The drive 212 reads the information stored at a mounted removal storage medium 24 such as a magnetic disk, an optical disk, a magneto-optical disk and a semiconductor memory and outputs the information to the RAM 203.

The communication device 215 is a communication interface constituted with a communication device and the like to be connected to a communication network 12, for example. Here, the communication device 215 may be a wireless local area network (LAN) compatible communication device, a wireless USB compatible communication device or a wired communication device to perform communication with a cable.

2-2. Functions of Image Extracting Apparatus

In the above, the hardware configuration of the moving image extracting apparatus 20 is described with reference to FIG. 3. Next, the functions of the moving image extracting apparatus 20 will be described with reference to FIGS. 4 to 11.

Figure 4:
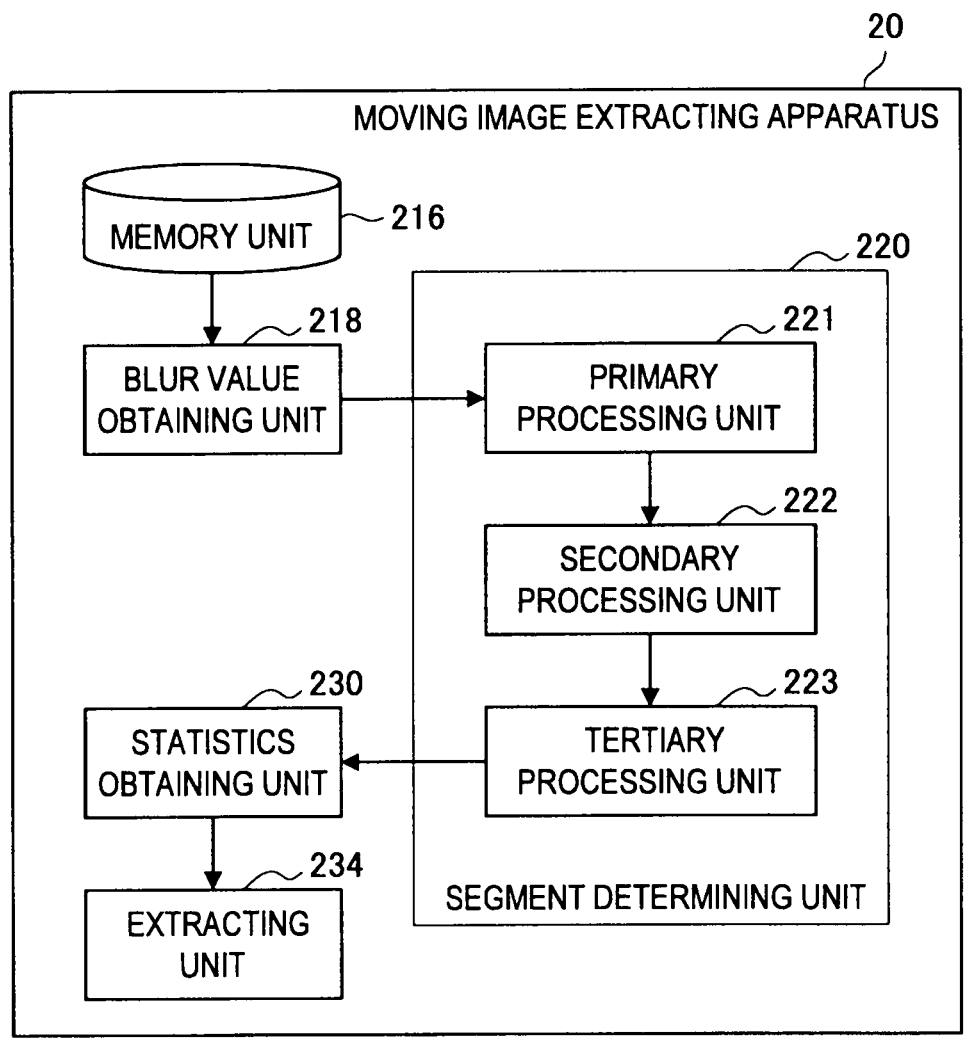
FIG. 4 is a functional block diagram which illustrates the configuration of the moving image extracting apparatus according to a first embodiment.

FIG. 4 is a functional block diagram illustrating the configuration of the moving image extracting apparatus 20 according to the first embodiment. As illustrate in FIG. 4, the moving image extracting apparatus 20 according to the first embodiment includes a memory unit 216, a blur value obtaining unit 218, a segment determining unit 220, a statistics obtaining unit 230 and an extracting unit 234.

The memory unit 216 is a storage medium having a moving image stored from the imaging device 10. A non-volatile memory, a magnetic disk, an optical disk, and a magneto-optical (MO) disk may be adopted as the storage medium. For example, an electrically erasable programmable read-only memory (EEPROM) and an erasable programmable read-only memory (EPROM) may be adopted as the non-volatile memory. A hard disk and a discoidal magnetic disk may be adopted as the magnetic disk. Further, a compact disc (CD), a digital versatile disc recordable (DVD-R) and a blu-ray disc (BD, a registered trademark) may be adopted as the optical disk. Here, the memory unit 216 may be a storage medium receiving a moving image transmitted from the imaging device 10.

The blur value obtaining unit 218 obtains a blur value of each frame constituting the moving image stored at the memory unit 216. The blur value can be obtained based on an edge part of a flame. For example, the more a frame is defocused and blurred, the more gradual the variation of brightness distribution at an edge part thereof is. Then, the more a frame is focused and not blurred, the sharper the variation of brightness distribution at an edge part thereof is. Accordingly, the blur value obtaining unit 218 may obtain a blur value based on variation sharpness of brightness distribution at an edge part thereof.

Figure 5:
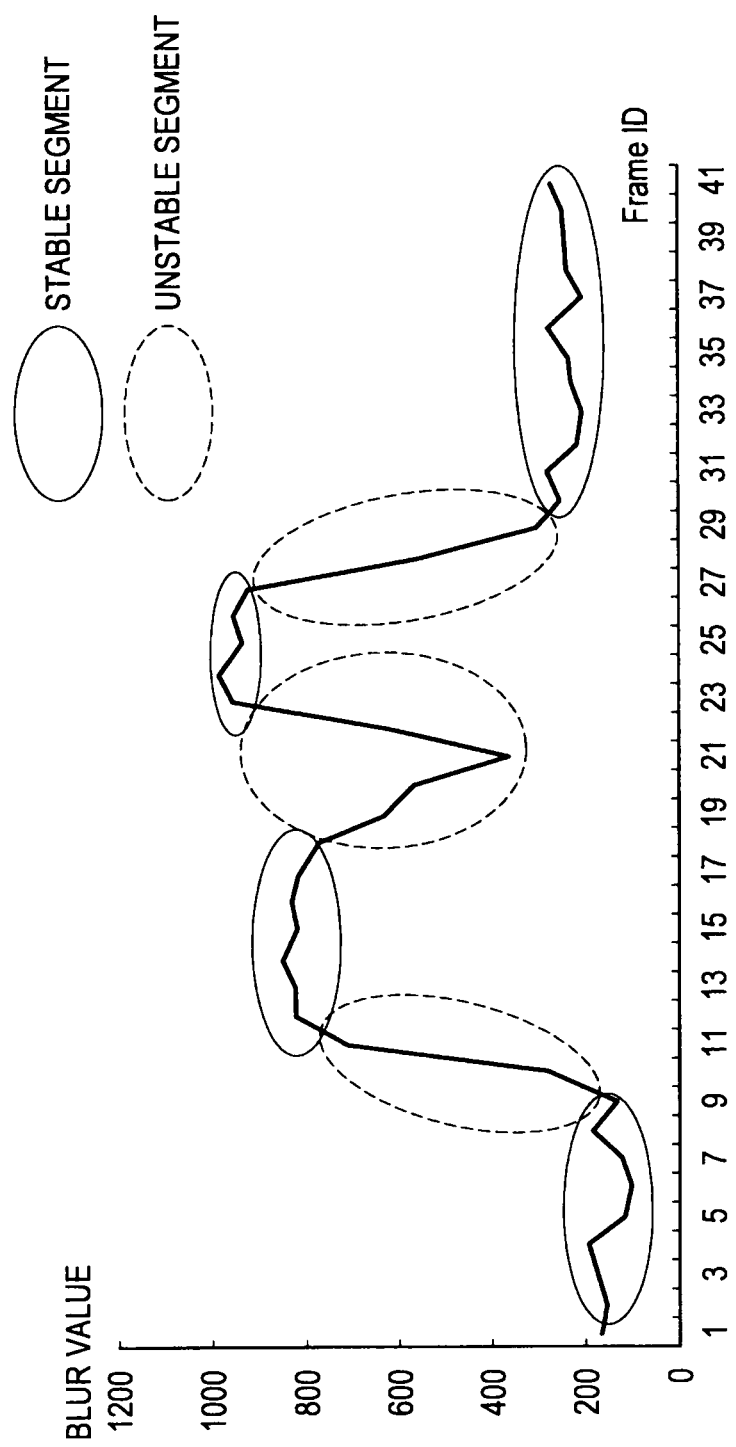
FIG. 5 is an explanatory view which illustrates a specific example of a stable segment and an unstable segment.

A segment determining unit 220 discriminates the moving image between a stable segment having a blur value variance equal to or smaller than a threshold value Th1 (i.e., a first value) and an unstable segment having a blur value variance larger than the threshold value Th1 based on the blur value of each flame obtained by the blur value obtaining unit 218, as illustrated in FIG. 5.

FIG. 5 is an explanatory view illustrating a specific example of stable segments and unstable segments. As illustrated in FIG. 5, the segment determining unit 220 determines a segment having a small blur value variation as a stable segment (i.e., a solid-line oval part) and determines a segment having a large blur value variation as an unstable segment (i.e., a dashed-line oval part). In order to perform such segment determination, the segment determining unit 220 includes a primary processing unit 221, a secondary processing unit 222 and a tertiary processing unit 223.

The primary processing unit 221 sequentially selects a different frame in the moving image as a start point and defines a stable segment while expanding the segment including the selected frame until the blur value variance exceeds the threshold value Th1. More specifically, the primary processing unit 221 defines the stable segment while expanding the segment as the selected frame being the start point in the future direction until the blur value variance exceeds the threshold value Th1, and then, expanding the segment in the past direction as well until the blur value variance exceeds the threshold value Th1. In the following, detailed description will be made with reference to FIG. 6.

Figure 6:
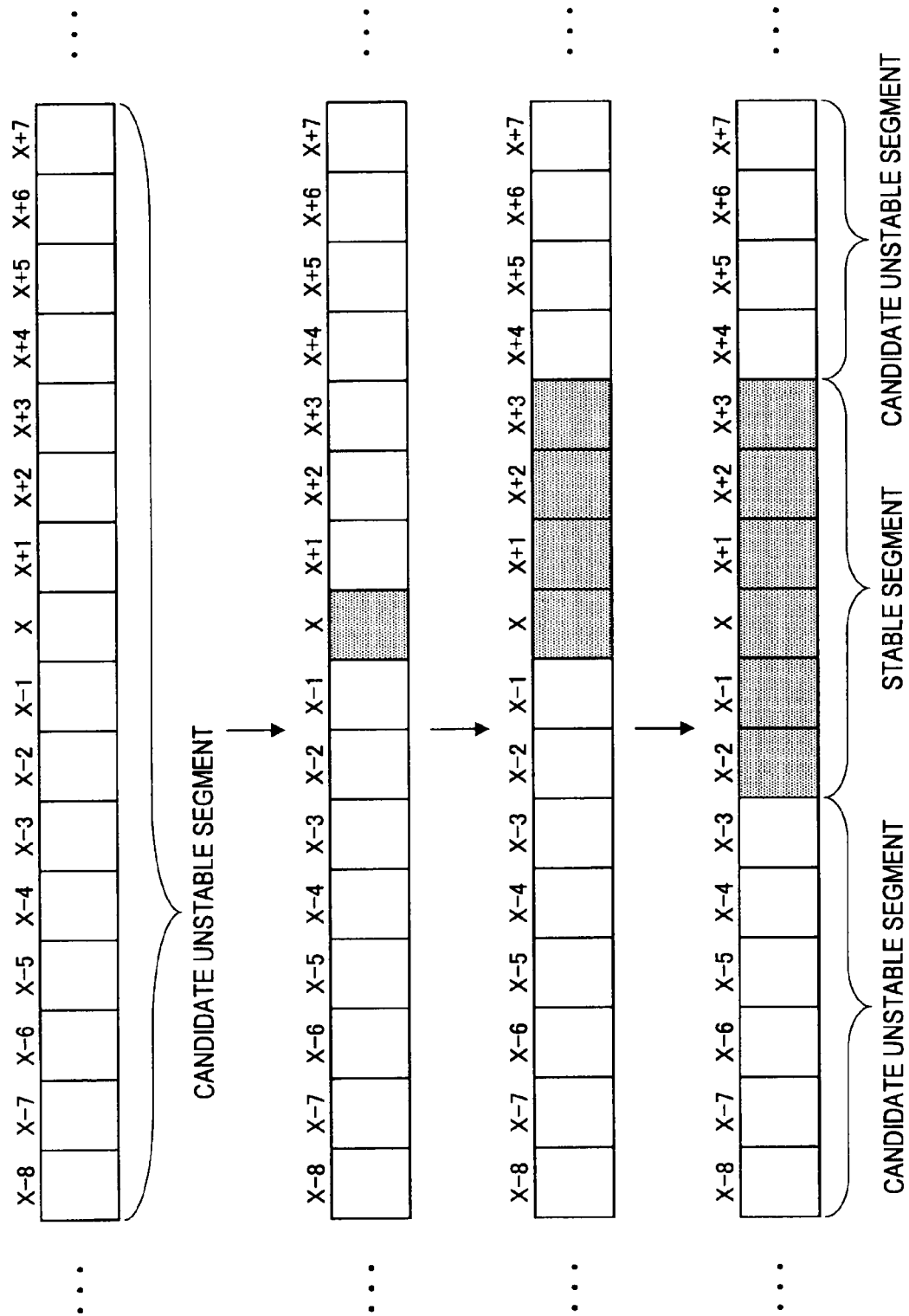
FIG. 6 is an explanatory view which illustrates a specific example of a primary process by a primary processing unit.

FIG. 6 is an explanatory view illustrating a specific example of the primary process by the primary processing unit 221. As illustrated at the first row in FIG. 6, all frames are candidate unstable segments at the beginning. In FIG. 6, "X−8", . . . , "X", . . . , "X+7" denote frame numbers.

Here, the second row in FIG. 6 illustrates a case that the primary processing unit 221 selects the frame "X" as the start point. In this case, the primary processing unit 221 expands the segment in the future direction to the frames "X+1", "X+2", "X+3" having the frame "X" as the start point. Since the blur value variance exceeds the threshold value Th1 when expanding the segment in the future direction to the frame "X+4", the primary processing unit 221 stops expanding the segment in the future direction at the frame "X+3" as illustrates at the third row in FIG. 6.

Subsequently, the primary processing unit 221 expands the segment in the past direction to the frames "X−1", "X−2" having the frame "X" as the start point. Since the blur value variance exceeds the threshold value Th1 when expanding the segment in the past direction to the frame "X−3", the primary processing unit 221 stops expanding the segment in the past direction at the frame "X−2" as illustrated at the fourth row in FIG. 6. By expanding the segment as described above, the primary processing unit 221 defines the stable segment.

Then, the primary processing unit 221 repeats the primary process of FIG. 6 as selecting a frame among the candidate unstable segments which are not defined as stable segments. For example, the primary processing unit 221 may select a frame having the maximum blur value or a frame having the minimum blur value among the candidate unstable segments. The primary processing unit 221 repeats the primary process until all of the frames are included in the stable segment or are selected respectively as the start point.

The secondary processing unit 222 determines whether or not the blur value variance of the segment including each candidate unstable segment (each primary instable segment) and the defined stable segments at both before and after the candidate unstable segment is equal to or smaller than the threshold value Th1. When the blur value variance of the above segment is equal to or smaller than the threshold value Th1, the secondary processing unit 222 defines the entire above segment as a stable segment. In the following, the secondary process by the secondary processing unit 222 will be specifically described with reference to FIG. 7.

Figure 7:
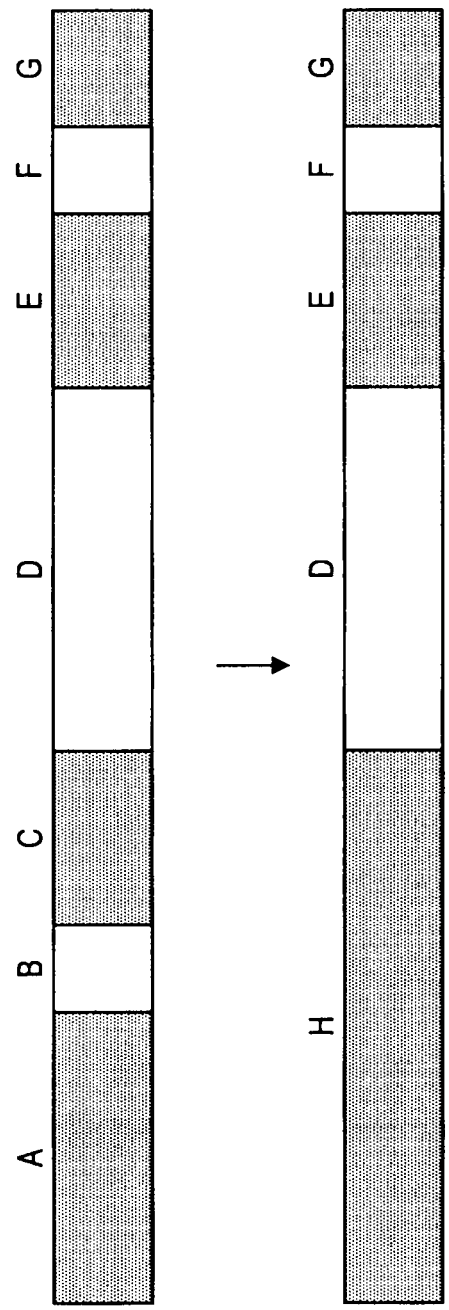
FIG. 7 is an explanatory view which illustrates a specific example of a secondary process by a secondary processing unit.

FIG. 7 is an explanatory view illustrating a specific example of the secondary process by the secondary processing unit 222. Here, color-filled parts at the upper row in FIG. 7 denote segments defined as stable segments by the first processing unit 221 and the other parts denote candidate unstable segments which are not defined as stable segments by the first processing unit 221. For example, the segments A, C, E and G at the upper row in FIG. 7 are stable segments and the segments B, D and F are candidate unstable segments.

Here, the secondary processing unit 222 selects the segment B being a candidate unstable segment and the segments A and C being stable segments at both before and after the segment B. Then, the secondary processing unit 222 calculates the blur value variance of selected segment of A, B and C. When the calculated blur value variance is equal to or smaller than the threshold value Th1, the entire segment of A, B and C is redefined as a stable segment as illustrated at the lower row in FIG. 7.

Subsequently, the secondary processing unit 222 selects the segment D being a candidate unstable segment and the segment E and the redefined segment H being stable segments. Then, the secondary processing unit 222 performs the secondary process as similar to the above. When the blur value variance of the segment of H, D and E exceeds the threshold value Th1, the states of respective segments H, D and E are maintained. The secondary processing unit 222 repeats the secondary process indicated in FIG. 7 until any segment possibly to be redefined as a stable segment does not exist.

The tertiary processing unit 223 expands the stable segment defined by the first processing unit 221 and the second processing unit 222 until the blur value variance exceeds the threshold value Th1. This is because the stable segment may be assumed to be further expanded as the blur value variance of the stable segment is decreased due to uniting of a plurality of segments with the secondary process by the secondary processing unit 222. In the following, the tertiary process by the tertiary processing unit 223 will be specifically described with reference to FIG. 8.

Figure 8:
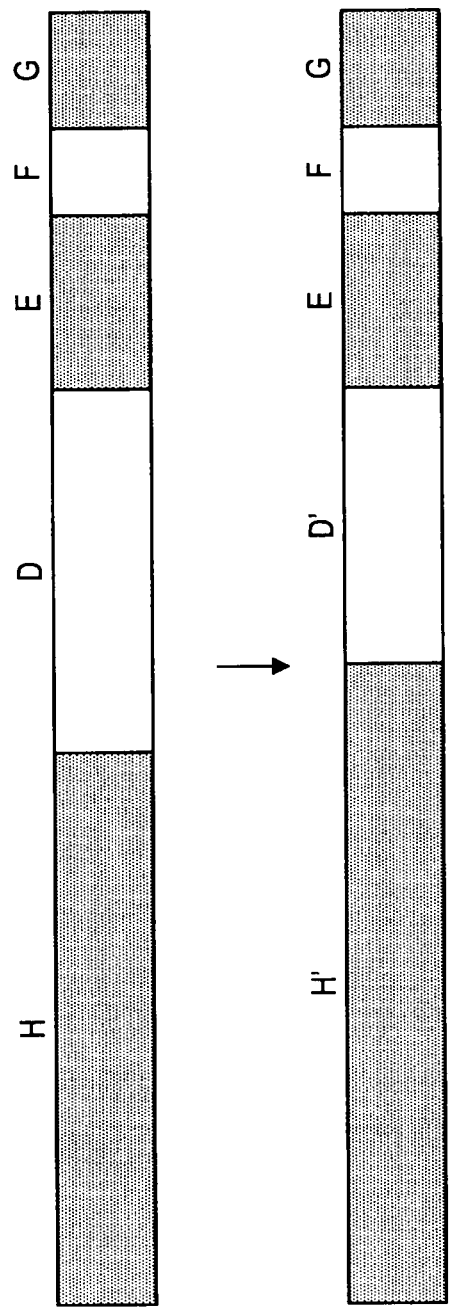
FIG. 8 is an explanatory view which illustrates a specific example of a tertiary process by a tertiary processing unit.

FIG. 8 is an explanatory view illustrating a specific example of the tertiary process by the tertiary processing unit 223. Here, the segment H at the upper row in FIG. 8 is the segment redefined as the stable segment by the secondary processing unit 222.

As illustrated at the lower row in FIG. 8, the tertiary processing unit 223 defines a segment H' as expanding the segment H until the blur value variance exceeds the threshold value Th1. FIG. 8 exemplifies an example that the tertiary processing unit 223 expands the segment H in the future direction. However, the tertiary processing unit 223 can expand the segment H in the past direction as well. The tertiary processing unit 223 performs the tertiary process indicated in FIG. 8 on every boundary between each stable segment and each unstable segment.

As described above, the segment determining unit 220 performs the primary to tertiary processes. Consequently, the segment determining unit 220 determines the stable segments defined with the tertiary process by the tertiary processing unit 223 as stable segments and determines the rest of segments as unstable segments.

The statistics obtaining unit 230 obtains the respective blur statistics lists of each stable segment and each unstable segment determined by the segment determining unit 220.

Figure 9:
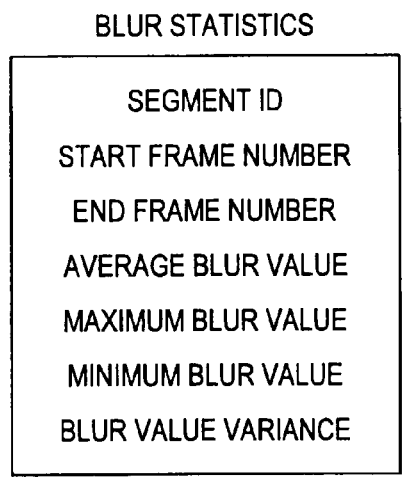
FIG. 9 is an explanatory view which illustrates an example of blur statistics.

FIG. 9 is an explanatory view illustrating an example of blur statistics. As illustrated in FIG. 9, the blur statistics includes a segment ID, a start frame number, an end frame number, an average blur value, a maximum blur value, a minimum blur value, a blur value variance and the like.

The extracting unit 234 extracts a failed cut, a suggested cut (i.e., a successful cut) or the like from the moving image based on the blur statistics of each segment obtained by the statistics obtaining unit 230. In the following, criteria for extracting a failed cut and criteria for extracting a suggested cut will be described.

(Extraction of Failed Cut)

For example, the extracting unit 234 extracts a segment corresponding to any one of following criteria as a failed cut.
(1) A segment of which maximum blur value is larger than a threshold value Th4 (i.e., a fourth value)
(2) An unstable segment before or after a stable segment of which maximum blur value is larger than the threshold value Th4 (i.e., the fourth value)
(3) A segment of which segment length is shorter than a threshold value Th5 (i.e., a fifth value)

In the following, a specific example of a failed cut to be extracted by the extracting unit 234 will be described with reference to FIG. 10.

Figure 10:
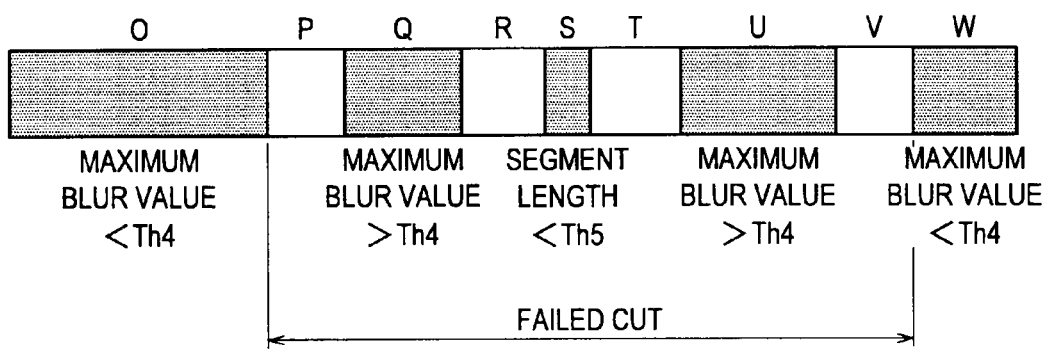
FIG. 10 is an explanatory view which illustrates a specific example of a failed cut extracted by an extracting unit.

FIG. 10 is an explanatory view illustrating the specific example of the failed cut to be extracted by the extracting unit 234. In FIG. 10, color-filled segments O, Q, S, U and W denote stable segments and other segments P, R, T and V denote unstable segments. The respective maximum blur values of the segments O, S, and W are larger than the threshold value Th4 and the respective maximum blur values of the segments Q and U are smaller than the threshold value Th4.

In this case, the extracting unit 234 extracts the stable segments Q and U as failed cuts based on the above (1). Further, the extracting unit 234 extracts the unstable segments P, R, T and V as failed cuts based on the above (2). In addition, the extracting unit 234 extracts the stable segment S of which segment length is shorter than the threshold value Th5 as a failed cut based on the above (3). As a result, the segments P to V are extracted as a failed cut in the example of FIG. 10.

For example, by deleting the failed cut extracted as described above from the moving image, a user can enhance density of worthwhile parts to watch and listen in the moving image. Here, the extraction criteria described in the above (1) to (3) are just examples. A criterion may be newly added and any of the criteria may be deleted.

(Extraction of Suggested Cut)

For example, the extracting unit 234 extracts a segment corresponding to all of the following criteria as a suggested cut.
(4) A segment of which average blur value is equal to or smaller than a threshold value Th2 (i.e., a second value)
(5) A segment of which segment length is equal to or longer than a threshold value Th3 (i.e., a third value)
(6) A segment of which blur value variance is equal to or smaller than a threshold value Th6 (i.e., a sixth value)

In the following, a specific example of a suggested cut to be extracted by the extracting unit 234 will be described with reference to FIG. 11.

Figure 11:
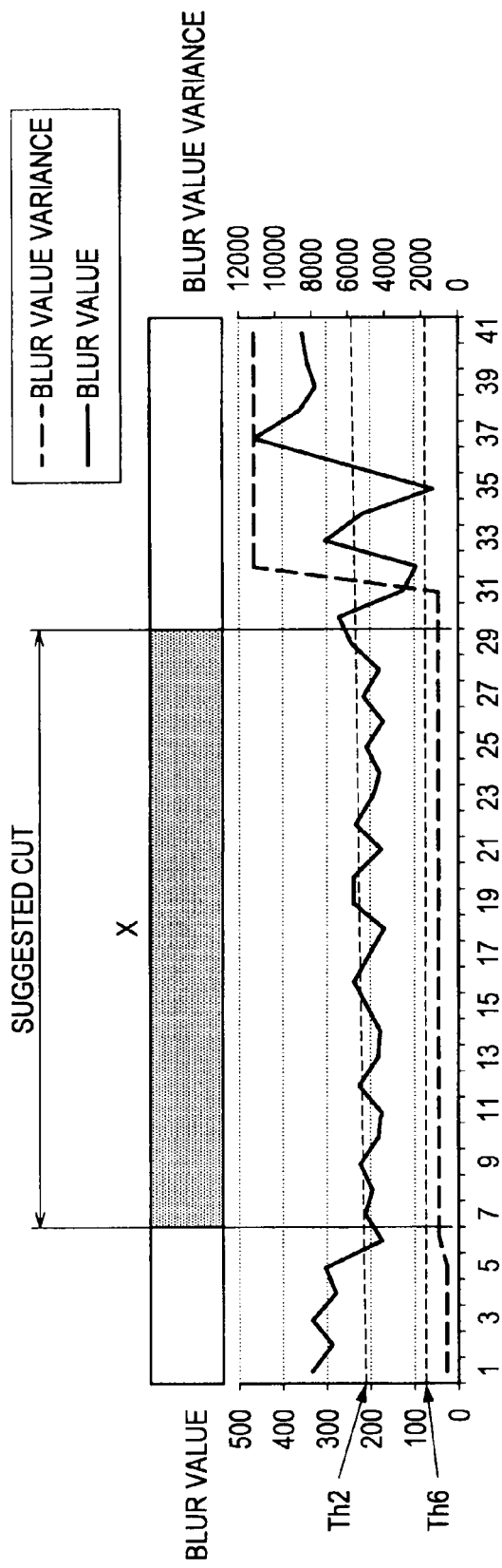
FIG. 11 is an explanatory view which illustrates a specific example of a suggested cut extracted by the extracting unit.

FIG. 11 is an explanatory view illustrating the specific example of the suggested cut to be extracted by the extracting unit 234. As illustrated in FIG. 11, the average blur value of the stable segment X is smaller than the threshold value Th2, so that the above (4) is satisfied. Further, the blur value variance of the stable segment X is smaller than the threshold value Th6, so that the above (6) is satisfied. Accordingly, when the segment length of the stable segment X is equal to or longer than the threshold value Th3 to satisfy the above (5) as well, the extracting unit 234 extracts the stable segment X as a suggested cut.

The moving image extracting apparatus 20 provides the suggested cut extracted as described above to a user, for example. Accordingly, it is possible for the user to selectively watch and listen a worthwhile part to watch and listen which is not defocused in the moving image. Here, the extraction criteria as described in the above (4) to (6) are just examples. A criterion may be newly added and any of the criteria may be deleted.

2-3. Operation of Image Extracting Apparatus

In the above, the configuration and functions of the moving image extracting apparatus 20 according to the first embodiment of the present invention have been described. Next, operation of the moving image extracting apparatus 20 according to the first embodiment will be described with reference to FIG. 12.

Figure 12:
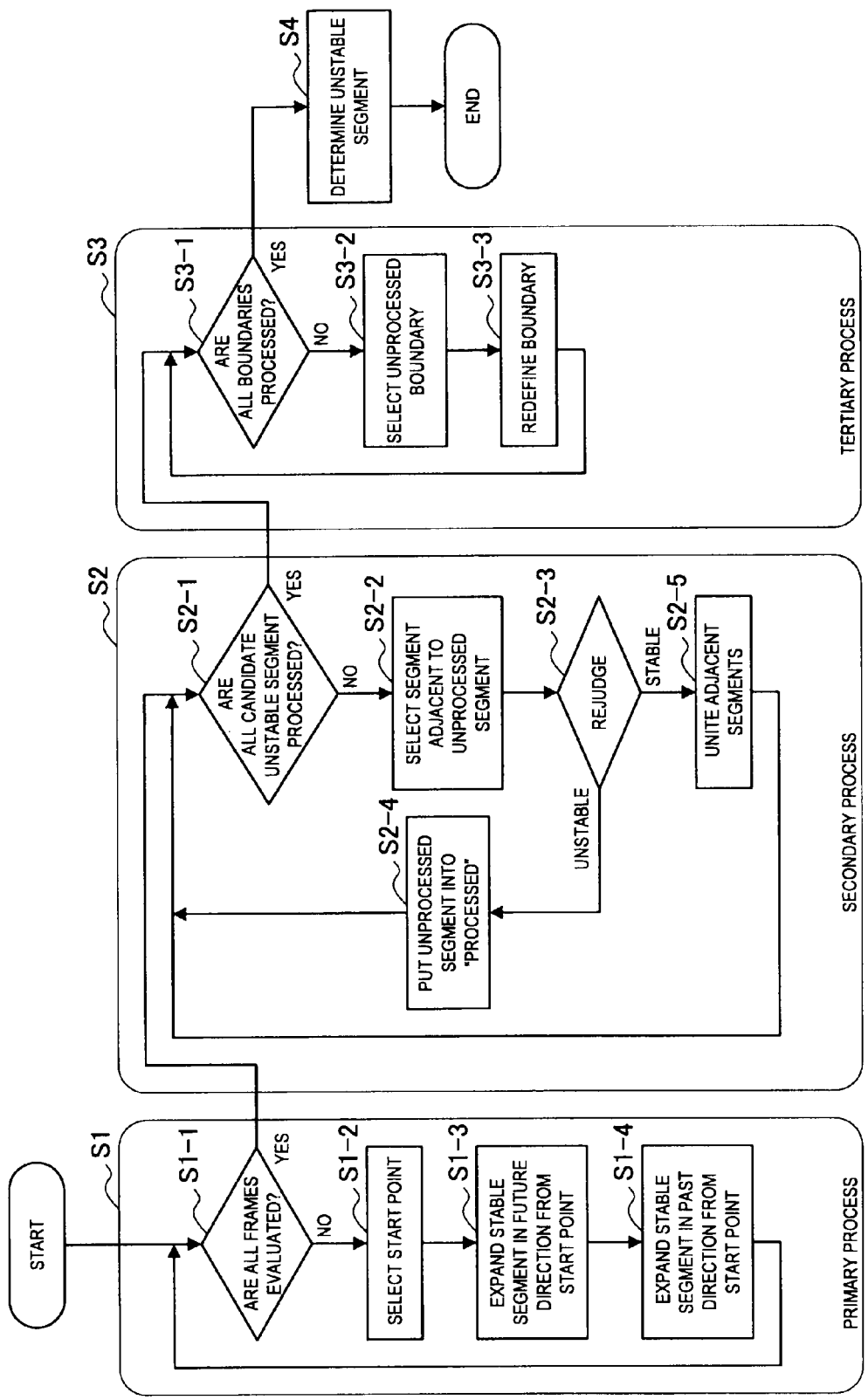
FIG. 12 is a flowchart which describes a flow of operation of the moving image extracting apparatus according to the first embodiment.

FIG. 12 is a flowchart describing the operational flow of the moving image extracting apparatus 20 according to the first embodiment. In FIG. 12, the flow of the process of S42 in FIG. 2 is described in detail.

As illustrated in FIG. 12, the moving image extracting apparatus 20 determines the unstable segment (S4) by performing the primary process (S1), the secondary process (S2) and the tertiary process (S3) after the blur value of each frame is obtained by the blur value obtaining unit 218.

(Primary Process)

The primary processing unit 221 repeats the primary process until all of the frames are evaluated (S1-1). Specifically, the primary processing unit 221 selects a frame as the start point among unevaluated frames in the moving image (S1-2). Here, the unevaluated frame denotes a frame which is not defined as a stable segment and which has not been selected as the start point.

Then, the primary processing unit 221 expands the segment in the future direction having the selected frame as the start point until the blur value variance exceeds the threshold value Th1 (S1-3). Then, the primary processing unit 221 defines the stable segment by expanding the segment in the past direction as well having the selected frame as the start point until the blur value variance exceeds the threshold value Th1 (S1-4).

(Secondary Process)

The secondary processing unit 222 repeats the secondary process until all of the candidate unstable segments are processed (S2-1). Specifically, the secondary processing unit 222 selects a stable segment which is adjacent to an unprocessed unstable segment (S2-2). Then, the secondary processing unit 222 determines whether or not the blur value variance of the entire segment of the selected three or two segments is equal to or smaller than the threshold value Th1 (S2-3).

When the blur value variance of the above entire segment exceeds the threshold value Th1, the secondary processing unit 222 puts the candidate unstable segment selected in S2-2 into "processed" (S2-4). On the other hand, when the blur value variance of the above entire segment is equal to or smaller than the threshold value Th1, the secondary processing unit 222 unites and redefines the above entire segment as a stable segment (S2-5).

(Tertiary Process)

The tertiary processing unit 223 repeats the tertiary process until every boundary between each stable segment and each candidate unstable segment are processed (S3-1). Specifically, the tertiary processing unit 223 selects an unprocessed boundary (S3-2) and expands the stable segment by one frame until the blur value variance exceeds the threshold value Th1 (S3-3).

With the above primary to tertiary processes, the stable segments defined with the tertiary process by the tertiary processing unit 223 are determined to be stable segments and the other segments are determined to be unstable segments (S4). Consequently, the extracting unit 234 is to be capable of extracting a failed cut or a suggested cut in accordance with a purpose or a user instruction.

3. Second Embodiment

Next, a moving image extracting apparatus 20' according to the second embodiment of the present invention will be described with reference to FIGS. 13 to 19. Here, the imaging device 10 illustrated in FIG. 1 is assumed to be the moving image extracting apparatus 20', for example. The moving image extracting apparatus 20' is capable of determining a stable segment or an unstable segment during the imaging is performed.

Figure 13:
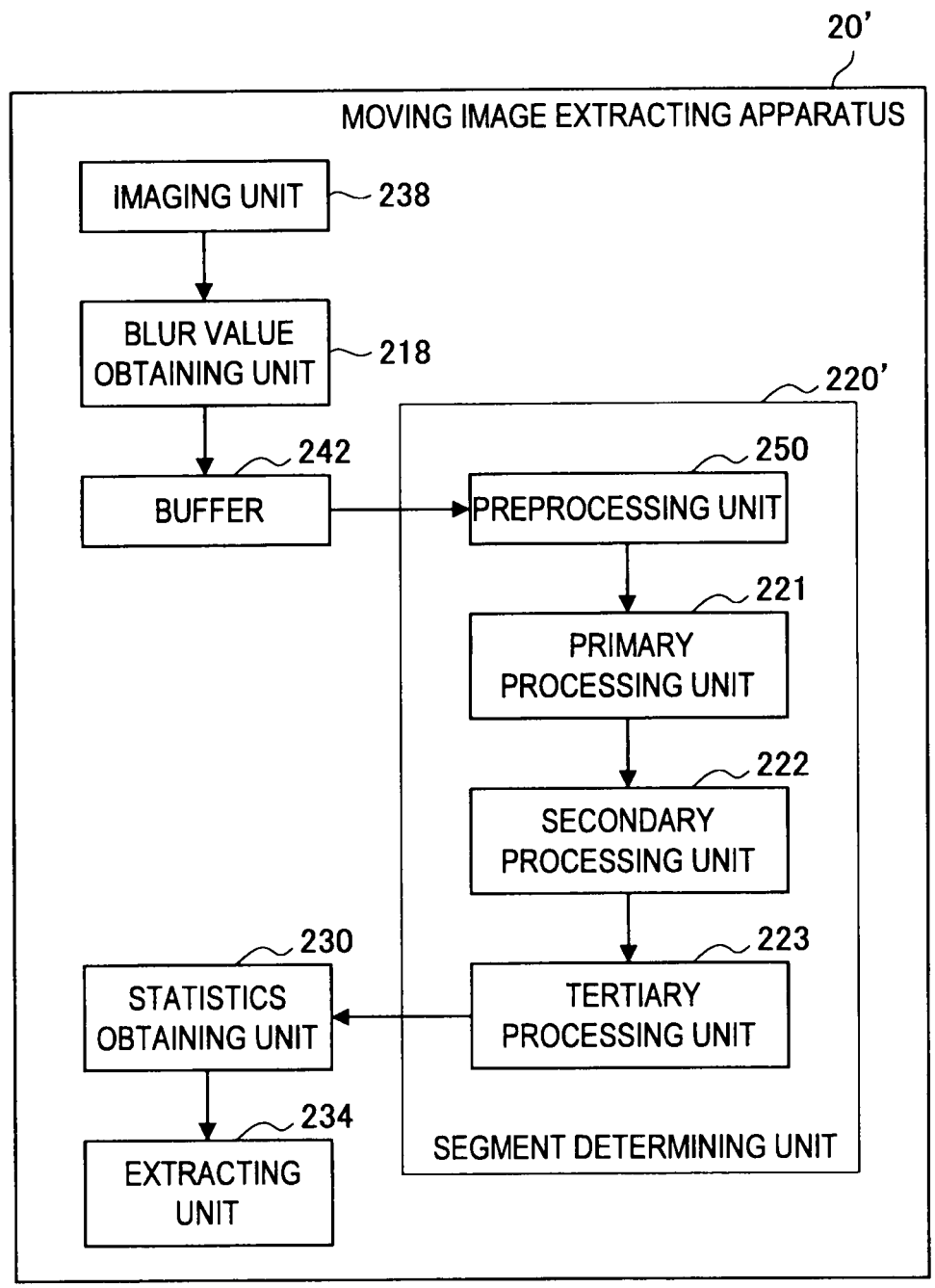
FIG. 13 is a functional block diagram which illustrates the configuration of a moving image extracting apparatus according to a second embodiment.

FIG. 13 is a functional block diagram illustrating the configuration of the moving image extracting apparatus 20' according to the second embodiment. As illustrated in FIG. 13, the moving image extracting apparatus 20' according to the second embodiment includes the blur value obtaining unit 218, a segment determining unit 220' the statistics obtaining unit 230, the extracting unit 234, an imaging unit 238 and a buffer 242.

The imaging unit 238 sequentially obtains new frames by imaging. The blur value obtaining unit 218 obtains a blur value of the frame obtained by the imaging unit 238. The buffer 242 sequentially and temporarily stores the blur values obtained by the blur value obtaining unit 218.

The segment determining unit 220' includes the primary processing unit 221, the secondary processing unit 222, the tertiary processing unit 223 and a preprocessing unit 250. In the following, blur values of unprocessed frames and blur values of processed frames will be described with reference to FIGS. 14 and 15.

Figure 14:
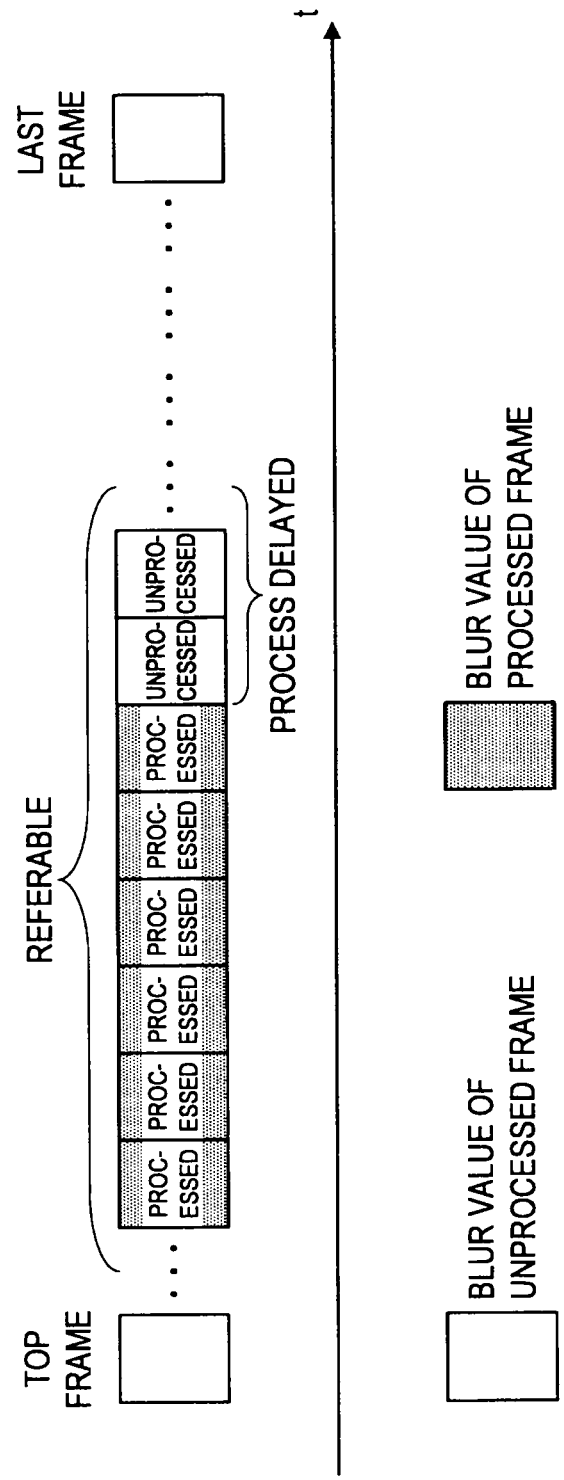
FIG. 14 is an explanatory view which schematically illustrates a blur value of an unprocessed frame and a blur value of an unprocessed frame.
Figure 15:
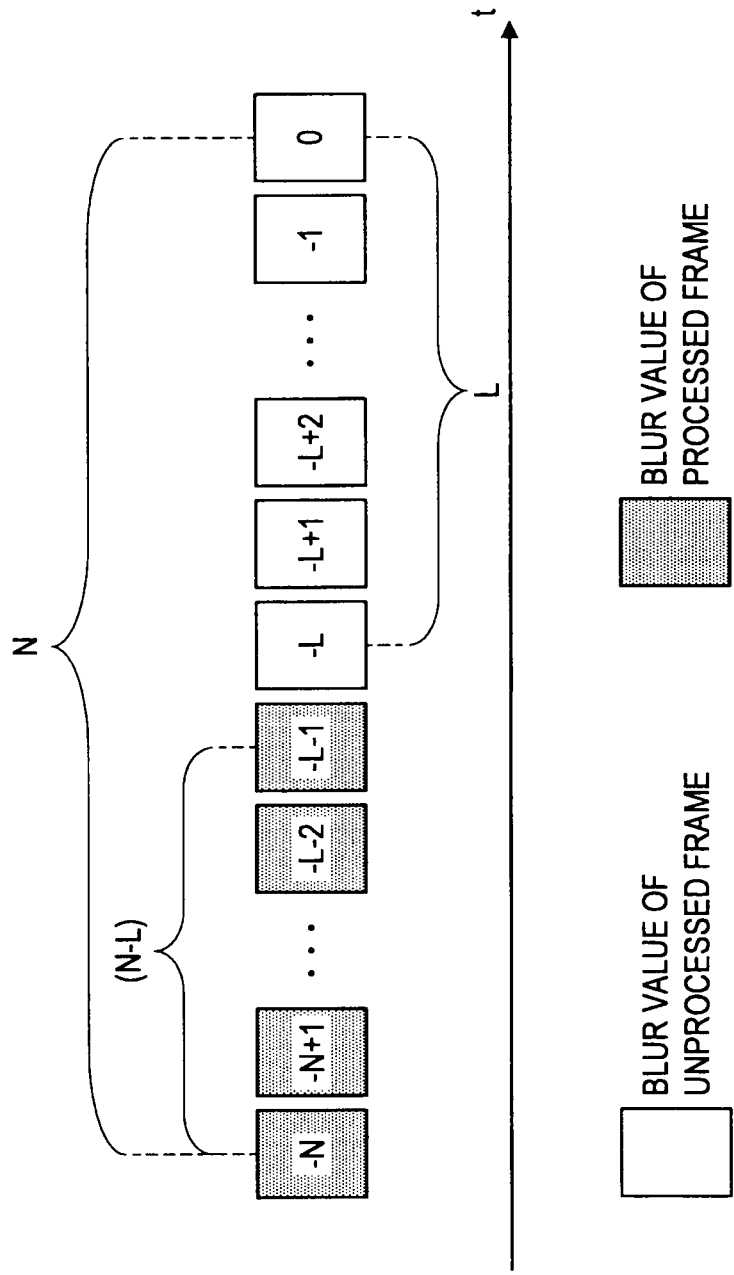
FIG. 15 is an explanatory view which schematically illustrates a blur value of an unprocessed frame and a blur value of an unprocessed frame.

FIGS. 14 and 15 are explanatory views schematically illustrating the blur values of the unprocessed frames and blur values of the processed frames. As illustrated in FIG. 14, the segment determining unit 220' is capable of referring to the blur values of the frames temporarily stored at the buffer 242 in the moving image. Here, as illustrated in FIG. 15, the present embodiment will be described as the frame number of the newest blur value being "0", the oldest unprocessed frame number being "−L", and the oldest processed frame number being "−N" which are temporarily stored at the buffer 242.

Figure 16:
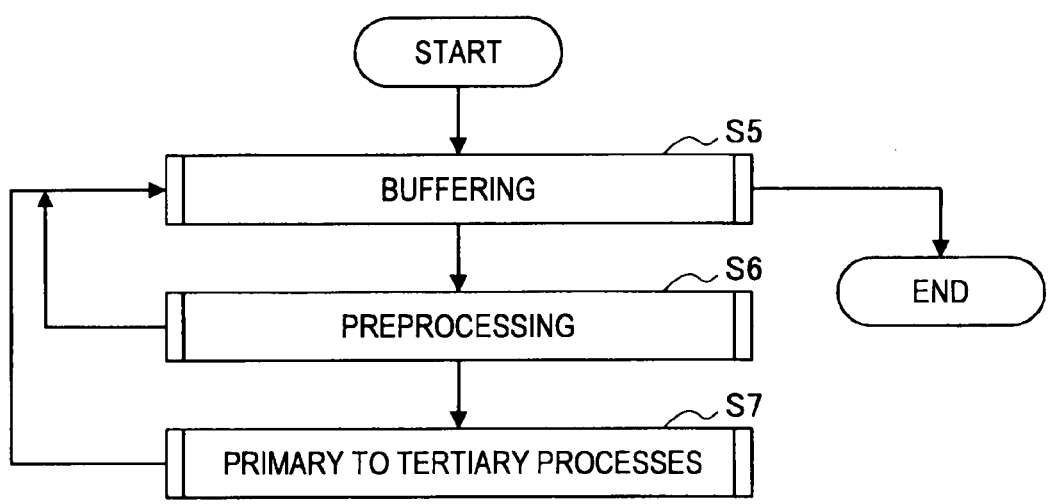
FIG. 16 is a flowchart which describes a flow of segment determination in the second embodiment.

FIG. 16 is a flowchart describing the flow of segment determination according to the second embodiment. As illustrated in FIG. 16, first, buffering is performed on the blur value at the buffer 242 (S5). Then, the preprocessing unit 250 of the segment determining unit 220' performs preprocessing (S6) and the primary to tertiary processing units 221 to 223 respectively performs the primary to tertiary processes (S7). In the following, the detailed flow of the buffering (S5) will be described with reference to FIG. 17 and the detailed flow of the preprocessing (S6) will be described with reference to FIGS. 18 and 19. Since the primary to tertiary processes (S7) are the same as described in the first embodiment, the description will not be repeated in the present embodiment.

Figure 17:
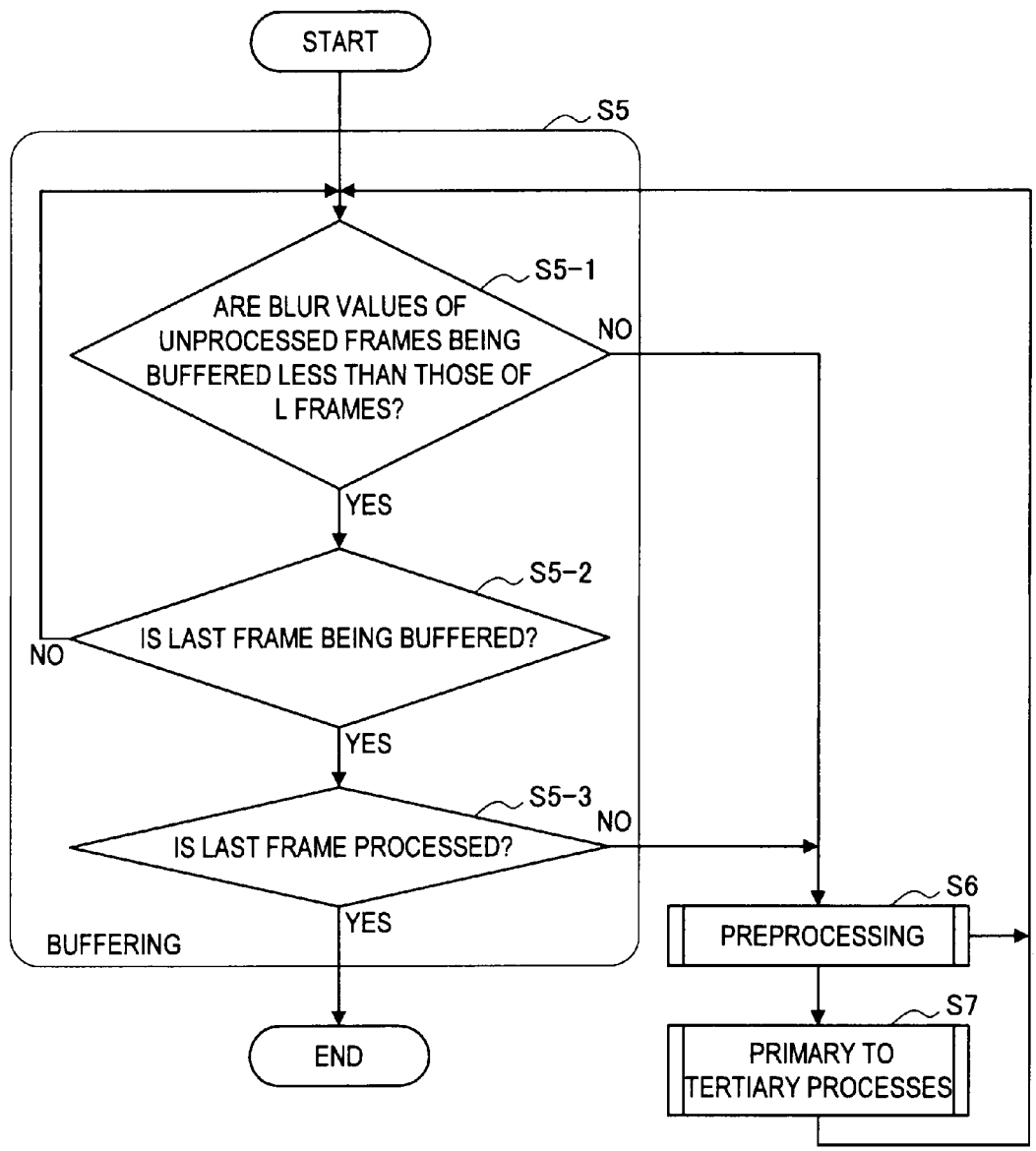
FIG. 17 is a flowchart which describes the detailed flow of buffering.

FIG. 17 is a flowchart illustrating the detailed flow of the buffering. First, the segment determining unit 220' determines whether or not the blur values of the unprocessed frames being buffered at the buffer 242 are less than those of L frames (S5-1). In the case that the blur values of the unprocessed frames being buffered are equal to or more than those of L frames, the preprocessing unit 250 of the segment determining unit 220' performs the preprocessing (S6).

On the other hand, in the case that the blur values of the unprocessed frames being buffered are less than those of L frames, the process from S5-1 is repeated when the last frame is not included in the frames being buffered (S5-2). When the last frame is included in the frames being buffered, the preprocessing unit 250 of the segment determining unit 220' performs the preprocessing (S6) unless the blur value of the last frame has been processed (S5-3). On the other hand, when blur value of the last frame has been processed, the segment determining process ends.

Figure 18:
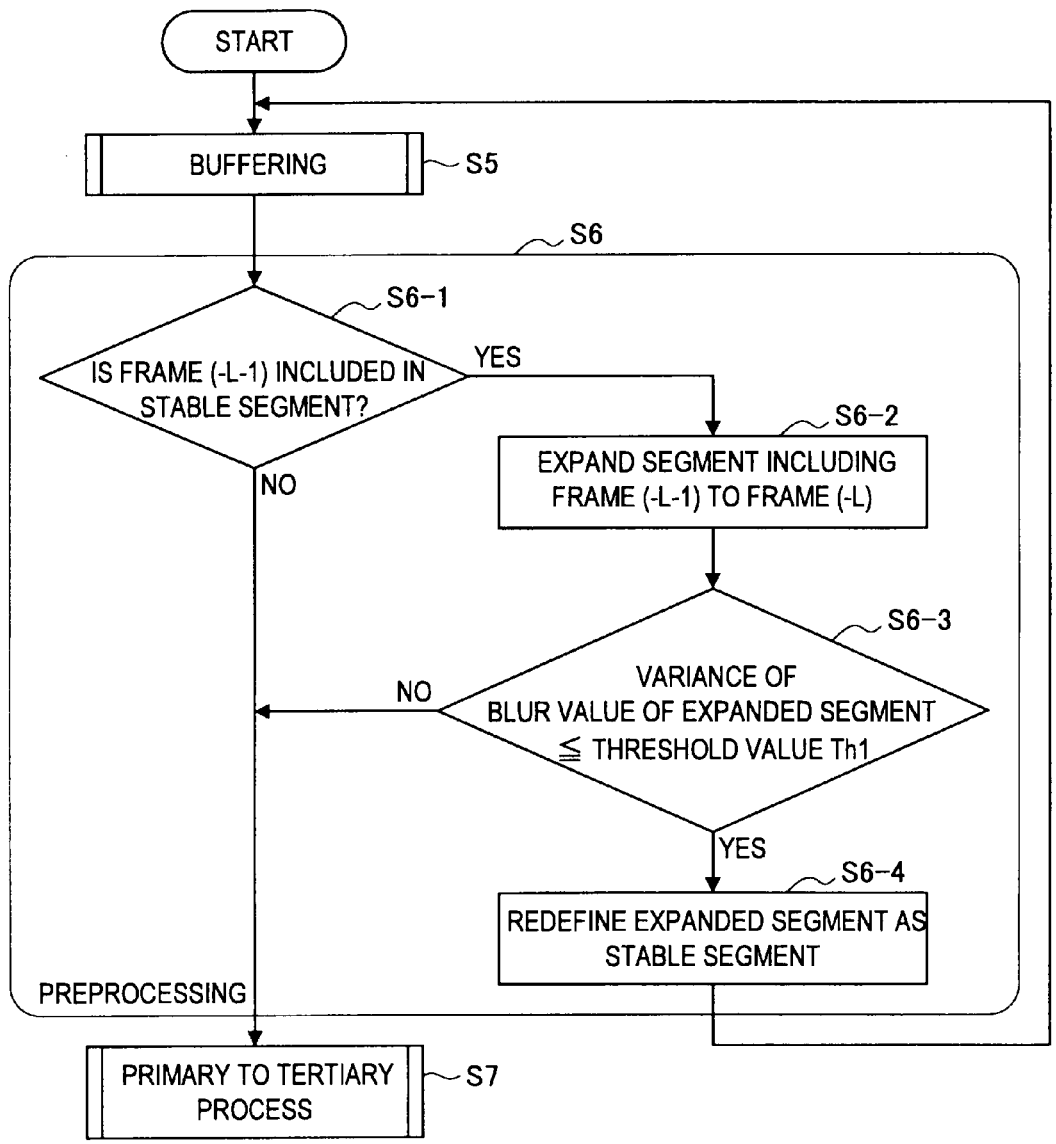
FIG. 18 is a flowchart which describes the detailed flow of preprocessing.

FIG. 18 is a flowchart describing the detailed flow of the preprocessing. As illustrated in FIG. 18, the preprocessing unit 250 determines whether or not the frame (L−1) is included in the stable segment (S6-1) after the buffering (S5). When the frame (L−1) is included in the stable segment, the stable segment including the frame (L−1) is expanded to the frame (L) (S6-2). Then, when the blur value variance of the segment expanded to the frame (L) is smaller than the threshold value Th1 (S6-3), the preprocessing unit 250 redefines the segment expanded to the frame (L) as a stable segment (S6-4). Thereafter, the processes from the buffering (S5) are repeated. On the other hand, when the frame (L−1) is not included in the stable segment (S6-1) or when the blur value variance of the segment expanded to the frame (L) is equal to or larger than the threshold value Th1 (S6-3), the primary to tertiary processes are performed on the referable blur values being buffered (S7). In the following, the above preprocessing will be specifically described with reference to FIG. 19.

Figure 19:
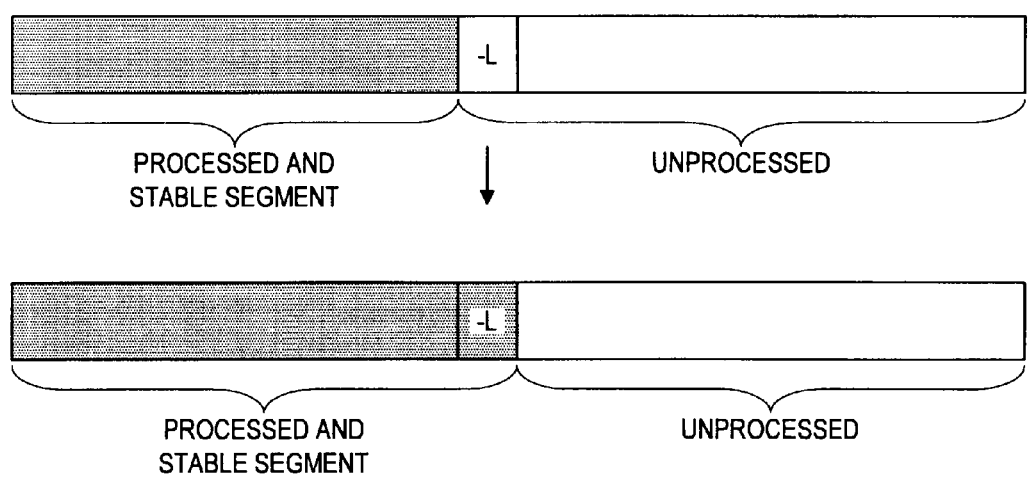
FIG. 19 is an explanatory view which illustrates a specific example of the preprocessing.

FIG. 19 is an explanatory view illustrating a specific example of the preprocessing. As illustrated in FIG. 19, when the frame just before the unprocessed frame (−L) is in a stable segment, the preprocessing unit 250 determines whether or not the blur value variance after adding the frame (−L) to the above stable segment is to be equal to or larger than the threshold value Th1. When the blur value variance is not to be equal to or larger than the threshold value Th1, the preprocessing unit 250 redefines the stable segment to include the frame (−L) as illustrated at the lower row in FIG. 19. On the other hand, when the blur value variance is to be equal to or larger than the threshold value Th1, the primary to tertiary processes described in the first embodiment are performed on the referable blur values being buffered. That is, the referable blur values being buffered receive the primary process (i.e., selecting the start point from unprocessed frames and expanding a stable segment), the secondary process (i.e., uniting a stable segment, an unstable segment and another stable segment) and the tertiary process (i.e., moving a boundary).

4. Summary

As described above, according to the first embodiment of the present invention, it is possible to discriminate a moving image between a stable segment and an unstable segment based on a blur value of each frame and to extract a failed cut or a suggested cut by utilizing blur statistics of each segment. Further, according to the second embodiment of the present invention, it is possible to determine a stable segment and an unstable segment during imaging is performed.

It should be understood by those skilled in the art that various modifications, combinations, sub-combinations and alterations may occur depending on design requirements and other factors insofar as they are within the scope of the appended claims or the equivalents thereof.

For example, each step in the processes of the moving image extracting apparatus 20 herein is not necessarily performed in time sequence in order described in the flowchart. For example, each step of the processes of the moving image extracting apparatus 20 may include a process which is serially performed and a process which is separately performed.

Further, it is also possible to prepare a computer program to exert functions similar to the hardware such as the CPU 201, the ROM 202 and the RAM 203 incorporated in the moving image extracting apparatus 20. Here, a storage medium storing the computer program may be provided. Further, a series of processes can be performed with hardware by constituting respective functional blocks in the functional block diagram in FIG. 4 with hardware.

The present application contains subject matter related to that disclosed in Japanese Priority Patent Application JP 2009-167909 filed in the Japan Patent Office on Jul. 16, 2009, the entire content of which is hereby incorporated by reference.

What is claimed is:

1. A moving image extracting apparatus comprising:
    a blur value obtaining unit to obtain a blur value which indicates a blur degree of each frame constituting a moving image;
    a segment determining unit to discriminate the moving image between a stable segment of which variance of the blur values obtained by the blur value obtaining unit is lower than a first value and an unstable segment which is not the stable segment; and
    an extracting unit to perform segment extraction from the moving image based on the stable segment or the unstable segment obtained by the segment determining unit.

2. The moving image extracting apparatus according to claim 1,
    wherein the segment determining unit includes a primary processing unit which sequentially selects a different frame in the moving image as a start point and defines a stable segment while expanding a segment including the selected frame until variance of the blur values exceeds the first value.

3. The moving image extracting apparatus according to claim 2,
    wherein the primary processing unit repeats defining the stable segment until any frame which is not defined as a stable segment and which is not selected as a start point does not exist.

4. The moving image extracting apparatus according to claim 2,
    wherein the segment determining unit includes a secondary processing unit which determines whether or not variance of blur values of a segment including each unstable segment and defined stable segments at before and after the unstable segment is smaller than the first value and defines the segment as a stable segment when the variance of the blur values of the segment is smaller than the first value.

5. The moving image extracting apparatus according to claim 4,
    wherein the segment determining unit includes a tertiary processing unit which expands the stable segment defined by the secondary processing unit until the variance of the blur values exceeds the first value.

6. The moving image extracting apparatus according to claim 5,
    wherein the extracting unit extracts a segment of which average value of the blur values is smaller than a second value among the stable segments and the unstable segments.

7. The moving image extracting apparatus according to claim 6,
    wherein the extracting unit extracts a segment of which segment length is longer than a third value in addition to being smaller of the average value of the blur values than the second value.

8. The moving image extracting apparatus according to claim 1,
    wherein the extracting unit extracts a segment of which maximum blur value is larger than a fourth value and a segment of which segment length is shorter than a fifth value among the stable segments and the unstable segments.

9. The moving image extracting apparatus according to claim 8,
    wherein the extracting unit further extracts an unstable segment adjacent to a stable segment of which maximum blur value is larger than the fourth value.

10. The moving image extracting apparatus according to claim 1, further comprising:
    a buffer to temporarily store a blur value of a new frame obtained by the blur value obtaining unit;
    wherein
    the segment determining unit performs discriminating of the moving image after blur values of unprocessed frames of a predetermined amount or more are stored at the buffer.

11. The moving image extracting apparatus according to claim 10,
    wherein the segment determining unit expands a stable segment including a frame immediately previous to an unprocessed frame to the unprocessed frame side until the variance of the blur values exceeds the first value in a case that the immediately previous frame is included in the stable segment.

12. A non-transitory computer readable medium including a program, which when executed by a computer, causes the computer to:
    obtain a blur value which indicates a blur degree of each frame constituting a moving image;
    discriminate the moving image between a stable segment of which variance of the obtained blur values is lower than a first value and an unstable segment which is not the stable segment; and
    perform segment extraction from the moving image based on the stable segment or the unstable segment.

13. A moving image extracting method, comprising the steps of:
    obtaining a blur value which indicates a blur degree of each frame constituting a moving image;
    discriminating the moving image between a stable segment of which variance of the blur values is smaller than a first value and an unstable segment which is not the stable segment; and
    performing segment extraction from the moving image based on the stable segment or the unstable segment.

* * * * *